US010427627B2

(12) United States Patent
Fukazu et al.

(10) Patent No.: US 10,427,627 B2
(45) Date of Patent: Oct. 1, 2019

(54) CABLE STRUCTURE AND VEHICLE

(71) Applicant: HONDA MOTOR CO., LTD., Tokyo (JP)

(72) Inventors: Tomohiro Fukazu, Wako (JP); Daisuke Komazawa, Wako (JP); Yuya Ishihara, Wako (JP); Daichi Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 143 days.

(21) Appl. No.: 15/426,980

(22) Filed: Feb. 7, 2017

(65) Prior Publication Data
US 2017/0232913 A1 Aug. 17, 2017

(30) Foreign Application Priority Data
Feb. 12, 2016 (JP) .................. 2016-024982

(51) Int. Cl.
| | |
|---|---|
| *H02B 1/20* | (2006.01) |
| *B60R 16/02* | (2006.01) |
| *B60K 1/02* | (2006.01) |
| *H02G 3/04* | (2006.01) |

(Continued)

(52) U.S. Cl.
CPC ............ *B60R 16/0222* (2013.01); *B60K 1/02* (2013.01); *B60L 50/50* (2019.02); *B60L 50/66* (2019.02); *B60R 16/0215* (2013.01); *H02G 3/0406* (2013.01); *H02G 3/0468* (2013.01); *H02P 27/06* (2013.01); *B60K 1/00* (2013.01); *B60K 1/04* (2013.01); *B60K 7/0007* (2013.01); *B60K 11/02* (2013.01); *B60K 11/06* (2013.01); *B60K 15/063* (2013.01); *B60K 17/356* (2013.01); *B60K 2001/003* (2013.01); *B60K 2001/005* (2013.01); *B60K 2001/0405* (2013.01); *B60K 2015/0633* (2013.01); *B60K 2015/0634* (2013.01);

(Continued)

(58) Field of Classification Search
USPC ........................................ 361/826
See application file for complete search history.

(56) References Cited

U.S. PATENT DOCUMENTS

| | | | | |
|---|---|---|---|---|
| 4,648,919 A | * | 3/1987 | Diaz .................... | G02B 6/4476 156/48 |
| 8,624,114 B2 | * | 1/2014 | Oga .................... | B60R 16/0215 174/72 A |

(Continued)

FOREIGN PATENT DOCUMENTS

| | | |
|---|---|---|
| JP | 2004-148850 | 5/2004 |
| JP | 2011-068187 | 4/2011 |

*Primary Examiner* — Hung S. Bui
(74) *Attorney, Agent, or Firm* — Mori & Ward, LLP

(57) ABSTRACT

A cable structure includes a first cable, a second cable, a communicating portion, and a ventilation-tube connecting portion. The first cable includes a first power line, a first connector, a second connector, and a first tube. The first tube covers the first power line and has a first space. The second cable includes a second power line, a third connector, a fourth connector, and a second tube. The second tube covers the second power line and has a second space. The first space communicates with the second space via the communicating portion. The ventilation-tube connecting portion is provided at the first tube or the second tube. The ventilation-tube connecting portion is connected to a ventilation tube through which the first space and the second space are ventilated.

12 Claims, 8 Drawing Sheets

(51) Int. Cl.
  *H02P 27/06* (2006.01)
  *B60L 50/50* (2019.01)
  *B60L 50/60* (2019.01)
  *B60K 1/04* (2019.01)
  *B60K 15/063* (2006.01)
  *B60K 1/00* (2006.01)
  *B60K 7/00* (2006.01)
  *B60K 11/02* (2006.01)
  *B60K 11/06* (2006.01)
  *B60K 17/356* (2006.01)

(52) U.S. Cl.
  CPC ....... *B60L 2210/10* (2013.01); *B60Y 2400/61* (2013.01); *B60Y 2410/10* (2013.01); *B60Y 2410/115* (2013.01); *Y02T 10/705* (2013.01); *Y02T 10/7005* (2013.01); *Y02T 10/7216* (2013.01); *Y02T 90/16* (2013.01)

(56) References Cited

U.S. PATENT DOCUMENTS

| | | | | |
|---|---|---|---|---|
| 9,412,491 B2* | 8/2016 | Inao | .................... | B60R 16/0215 |
| 2005/0162015 A1* | 7/2005 | Yamaguchi | ......... | B60R 16/0215 |
| | | | | 307/10.1 |
| 2011/0068622 A1* | 3/2011 | Ikeno | ....................... | B60K 1/00 |
| | | | | 307/10.1 |
| 2014/0284102 A1* | 9/2014 | Ichikawa | ............ | B60R 16/0215 |
| | | | | 174/72 A |
| 2015/0101842 A1* | 4/2015 | Han | .................... | B60R 16/0222 |
| | | | | 174/50.57 |
| 2017/0232867 A1* | 8/2017 | Fukazu | .................. | H02P 27/06 |
| | | | | 318/503 |
| 2017/0237379 A1* | 8/2017 | Fukazu | .................. | B60L 15/02 |
| | | | | 318/503 |

\* cited by examiner

CABLE STRUCTURE AND VEHICLE

CROSS-REFERENCE TO RELATED APPLICATIONS

The present application claims priority under 35 U.S.C. § 119 to Japanese Patent Application No. 2016-024982, filed Feb. 12, 2016, entitled "Cable Structure and Vehicle." The contents of this application are incorporated herein by reference in their entirety.

BACKGROUND

1. Field

The present disclosure relates to a cable structure and a vehicle.

2. Description of the Related Art

Vehicles such as hybrid vehicles and electric vehicles, which use motor power for propulsion, generally include a high-voltage device (for example, a high-voltage battery) that supplies electric power to a motor and a power converter (for example, an inverter) that performs electric power conversion when the electric power of the high-voltage device is supplied to the motor. Japanese Unexamined Patent Application Publication No. 2011-68187, for example, describes a hybrid vehicle including a motor and a power converter, which are disposed in a front section of the vehicle, and a high-voltage device, which is disposed in a rear section of the vehicle. Japanese Unexamined Patent Application Publication No. 2004-148850 describes a hybrid vehicle including a motor, which is disposed in a front section of the vehicle, and a high-voltage device and a power converter, which are disposed in a rear section of the vehicle.

Cables including a direct-current cable for electrically connecting the high-voltage device to the power converter and a three-phase cable for electrically connecting the power converter to the motor are arranged in this type of vehicle. Cables arranged outside a vehicle cabin have a waterproof function. Cables having a waterproof function are formed by, for example, airtightly covering a power line having connectors at both ends thereof with a tube.

SUMMARY

According to a first aspect of the present invention, a cable structure includes a first cable and a second cable. The first cable includes a power line, on which connectors are provided at both ends of the power line, and a tube that covers the power line. The second cable includes a power line, on which connectors are provided at both ends of the power line, and a tube that covers the power line. The first cable and the second cable have a waterproof function. A space inside the tube of the first cable communicates with a space inside the tube of the second cable. A ventilation-tube connecting portion, to which a ventilation tube is connected, is provided on the tube of the first cable or the tube of the second cable. The space inside the tube of the first cable and the space inside the tube of the second cable are capable of being ventilated through the ventilation-tube connecting portion.

According to a second aspect of the present invention, a vehicle includes an electronic device and a cable connected to the electronic device. The electronic device is housed in a housing including a breather chamber opened to atmosphere. The cable includes a power line, on which connectors are provided at both ends of the power line, and a tube that covers the power line so that the cable has a waterproof function. A ventilation-tube connecting portion, to which a ventilation tube is connected, is provided on the tube. The ventilation tube communicates with the breather chamber. A space inside the tube is opened to atmosphere through the breather chamber.

According to a third aspect of the present invention, a cable structure includes a first cable, a second cable, a communicating portion, and a ventilation-tube connecting portion. The first cable has a waterproof structure. The first cable includes a first power line, a first connector, a second connector, and a first tube. The first power line has a first distal end and a second distal end opposite to the first distal end along a length of the first power line. The first connector and the second connector are provided at the first distal end and the second distal end, respectively. The first tube covers the first power line and has a first space inside the first tube. The second cable has a waterproof structure. The second cable includes a second power line, a third connector, a fourth connector, and a second tube. The second power line has a third distal end and a fourth distal end opposite to the third distal end along a length of the second power line. The third connector and the fourth connector are provided at the third distal end and the fourth distal end, respectively. The second tube covers the second power line and has a second space inside the second tube. The first space communicates with the second space via the communicating portion. The ventilation-tube connecting portion is provided at the first tube or the second tube. The ventilation-tube connecting portion is connected to a ventilation tube through which the first space and the second space are ventilated.

According to a fourth aspect of the present invention, a vehicle includes an electronic device, a housing, a cable, and a ventilation-tube connecting portion. The housing includes a breather chamber opened to atmosphere and accommodates the electronic device. The cable is connected to the electronic device. The cable includes a power line and a tube. Connectors are provided at both ends of the power line. The tube covers the power line so that the cable has a waterproof structure. The ventilation-tube connecting portion is provided at the tube and is connected to a ventilation tube which communicates with the breather chamber such that a space inside the tube is opened to atmosphere through the breather chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
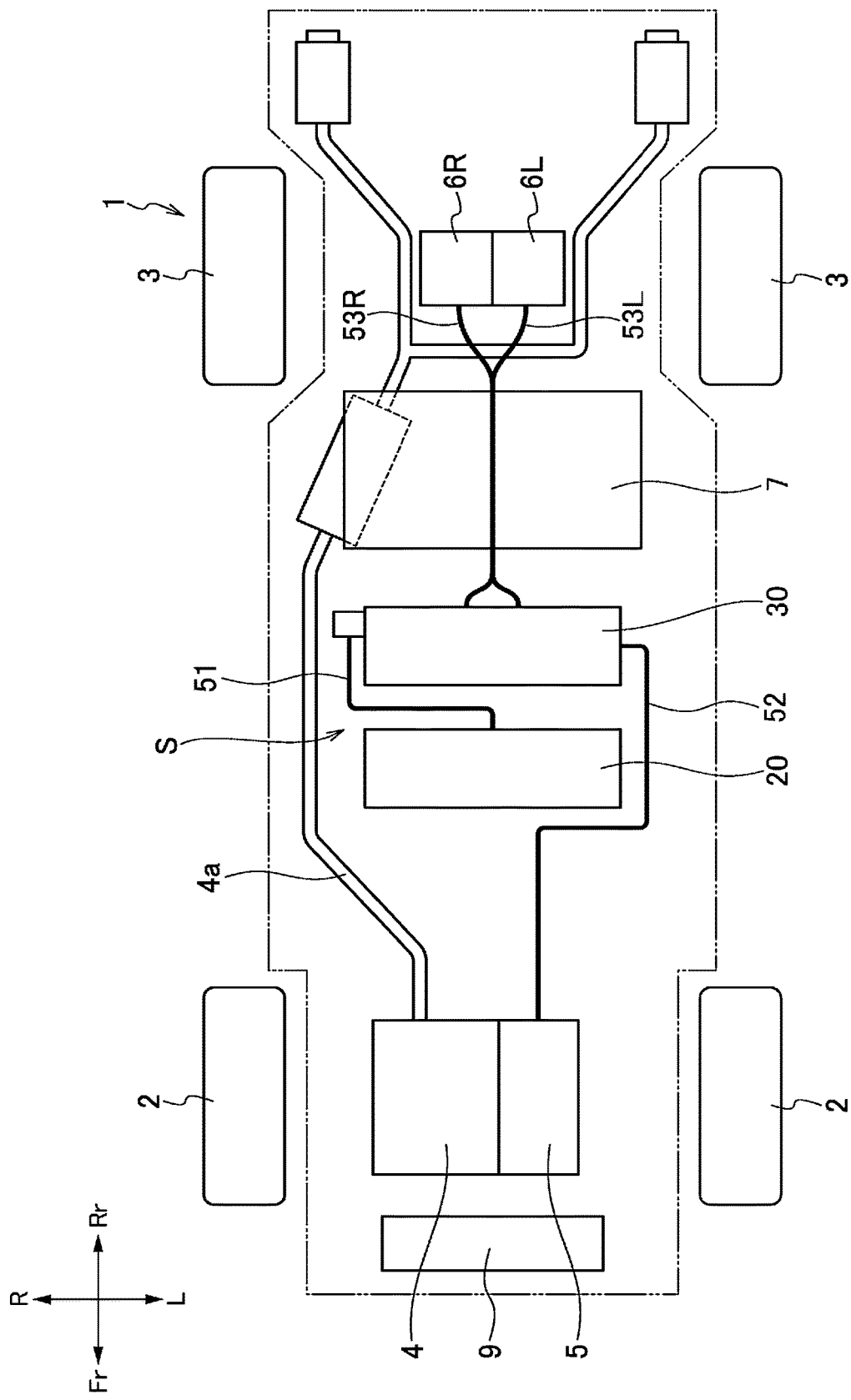
FIG. 1 is a schematic plan view illustrating the arrangement of main components of a vehicle according to an embodiment of the present disclosure.

The embodiments will now be described with reference to the accompanying drawings, wherein like reference numerals designate corresponding or identical elements throughout the various drawings.

Vehicle

A vehicle according to an embodiment of the present disclosure will be described with reference to the drawings. The drawings are to be viewed in the orientation of the reference numerals. In the following description, the front-rear, left-right, and up-down directions are the directions as viewed from the driver. In the drawings, the front, rear, left, right, up, and down sides of the vehicle are respectively denoted by Fr, Rr, L, R, U, and D.

Figure 2:
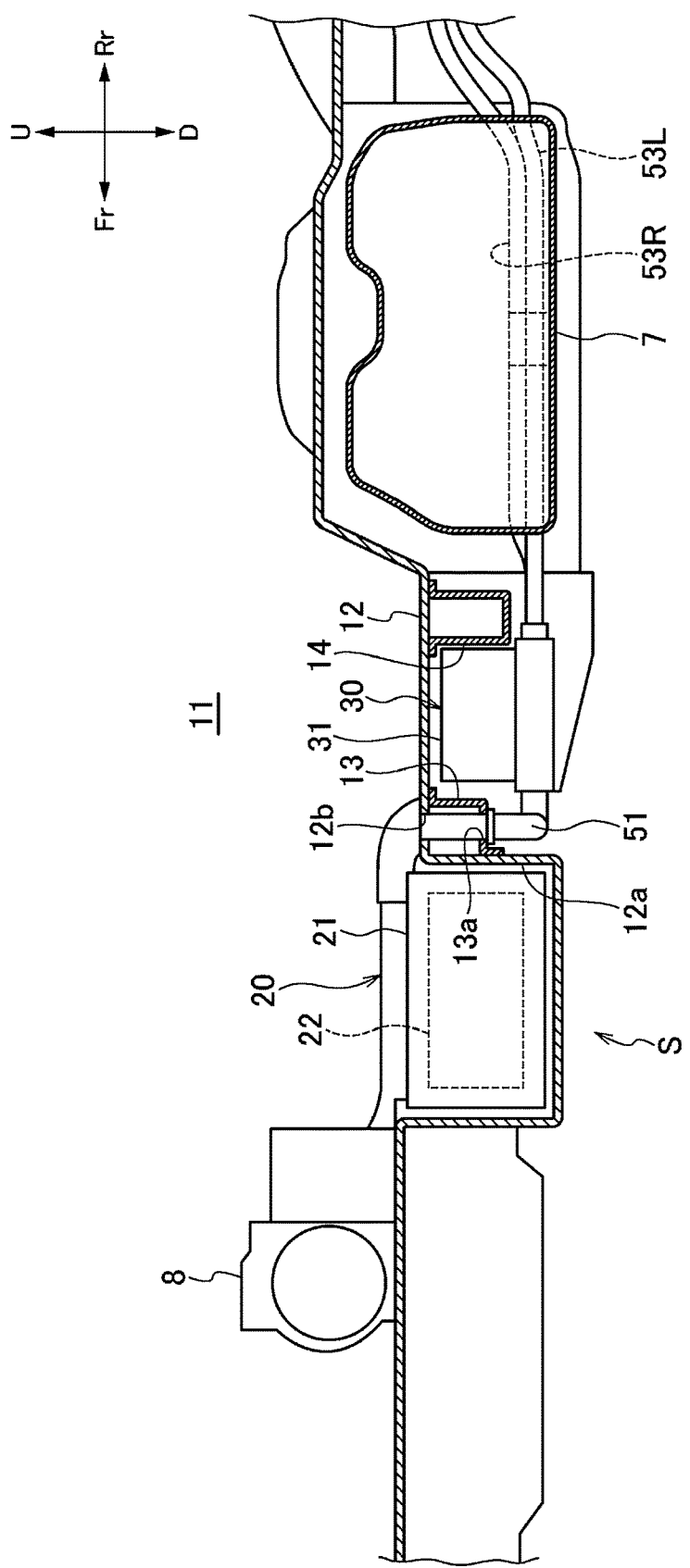
FIG. 2 is a schematic sectional view of a high-voltage-device arrangement section of the vehicle illustrated in FIG. 1, taken in a front-rear direction.
Figure 3:
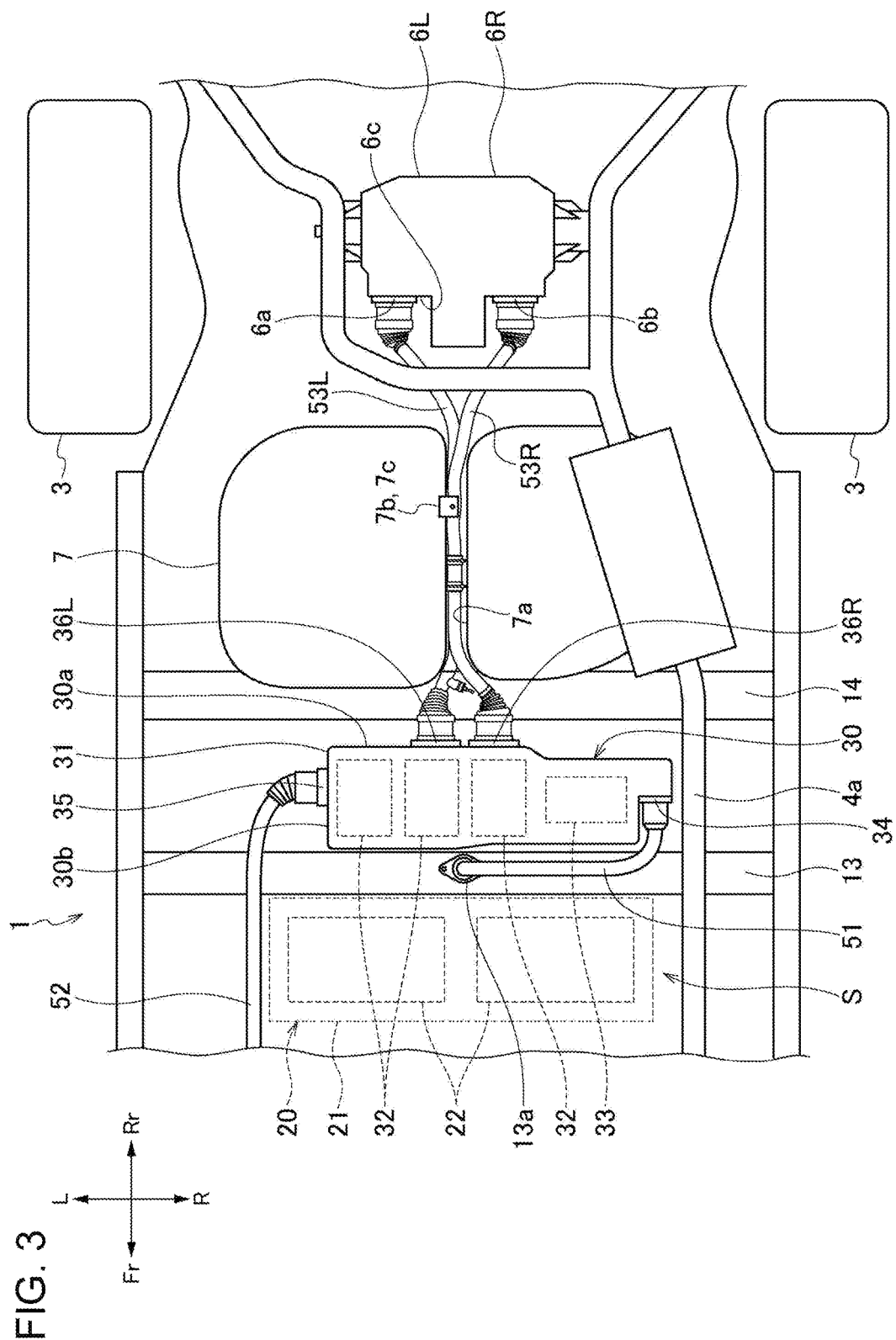
FIG. 3 is a bottom view of the high-voltage-device arrangement section, a fuel tank, and rear-wheel drive motors included in the vehicle illustrated in FIG. 1.

As shown in FIGS. 1 to 3, a vehicle 1 according to the present embodiment includes a structure for driving front wheels 2 and rear wheels 3. The structure includes an engine 4 and a front-wheel drive motor 5 for driving the front wheels 2; a left rear-wheel drive motor 6L for driving the left rear wheel 3; a right rear-wheel drive motor 6R for driving the right rear wheel 3; a battery unit 20 for supplying electric power to the motors 5, 6L, and 6R; a power conversion unit 30 that performs electric power conversion when the electric power of the battery unit 20 is supplied to the motors 5, 6L, and 6R; a fuel tank 7 that stores fuel for the engine 4; and an exhaust pipe 4a that guides the exhaust from the engine 4 to the rear of the vehicle 1. The engine 4 and the front-wheel drive motor 5 are disposed in an engine room located in a front section of the vehicle, and the rear-wheel drive motors 6L and 6R and the fuel tank 7 are disposed below a floor panel 12 in a rear section of the vehicle. The exhaust pipe 4a extends rearward from the engine 4 through a region on the right side of the fuel tank 7, and then branches into portions that extend further rearward through regions on the left and right sides of the rear-wheel drive motors 6L and 6R.

The battery unit 20 includes a housing 21 having a rectangular parallelepiped shape that extends in the left-right direction in plan view, a plurality of high-voltage batteries 22 that supply electric power to the motors 5, 6L, and 6R, and a cooling mechanism (not shown) that cools the high-voltage batteries 22. The high-voltage batteries 22 and the cooling mechanism are disposed in the housing 21.

The high-voltage batteries 22 are devices to be cooled having a low management temperature, and are easily affected by an outside air temperature (including a temperature increase due to the exhaust pipe 4a). The cooling mechanism for the battery unit 20 is an air-cooled cooling mechanism, which is suitable for cooling devices having a low management temperature, and cools the high-voltage batteries 22 by using the air in a vehicle cabin 11 (in the present embodiment, cold air ejected from an air-conditioning device 8 for conditioning the air in the vehicle cabin 11).

The power conversion unit 30 includes a housing 31 having a rectangular parallelepiped shape that extends in the left-right direction in plan view, a plurality of inverters 32 that perform electric power conversion when the electric power of the battery unit 20 is supplied to the motors 5, 6L, and 6R; a DC-DC converter 33 that performs voltage conversion to supply the electric power of the battery unit 20 to, for example, the air-conditioning device 8 and a low-voltage battery (not shown); and a cooling mechanism (not shown) for cooling the inverters 32 and the DC-DC converter 33. The inverters 32, the DC-DC converter 33, and the cooling mechanism are disposed in the housing 31.

The inverters 32 and the DC-DC converter 33 are devices to be cooled having a management temperature higher than that of the high-voltage batteries 22, and the influence thereon of the outside air temperature is small. The cooling mechanism for the power conversion unit 30 is a water-cooled cooling mechanism, which is suitable for cooling devices having a high management temperature, and cools the inverters 32 and the DC-DC converter 33 by using cooling water supplied from a radiator 9.

As shown in FIGS. 1 and 2, the battery unit 20 and the power conversion unit 30 are disposed in a high-voltage-device arrangement section S, which is provided in a central region of the vehicle 1. More specifically, the high-voltage-device arrangement section S is located between the front-wheel drive motor 5 and the rear-wheel drive motors 6L and 6R in the front-rear direction, and the battery unit 20 and the power conversion unit 30 are arranged next to each other in the front-rear direction in the high-voltage-device arrangement section S. The fuel tank 7 is disposed between the high-voltage-device arrangement section S and the rear-wheel drive motors 6L and 6R.

As shown in FIG. 2, the battery unit 20 is disposed in the vehicle cabin 11. More specifically, the battery unit 20 is disposed in a recess 12a formed in a side of the floor panel 12 that faces the vehicle cabin 11. The high-voltage batteries 22 included in the battery unit 20, which is disposed in the vehicle cabin 11, are cooled by cold air ejected from the air-conditioning device 8 for conditioning the air in the vehicle cabin 11.

The power conversion unit 30 is disposed outside the vehicle cabin 11. More specifically, the power conversion unit 30 is disposed behind the battery unit 20 and below the floor panel 12. The inverters 32 and the DC-DC converter 33 included in the power conversion unit 30, which is disposed outside the vehicle cabin 11, are cooled by the cooling water supplied from the radiator 9 through a region outside the vehicle cabin 11.

A center cross member 13 and a rear cross member 14, which reinforce the floor panel 12, are provided on a side of the floor panel 12 that is outside the vehicle cabin 11. Each of the center cross member 13 and the rear cross member 14 forms a closed cross section together with the floor panel 12, so that the floor panel 12 has sufficient rigidity. The center cross member 13 is located between the battery unit 20 and the power conversion unit 30, and the rear cross member 14 is located between the power conversion unit 30 and the fuel tank 7.

The battery unit 20 and the power conversion unit 30 are respectively disposed inside and outside the vehicle cabin 11 with the floor panel 12 disposed therebetween, and are arranged so as to overlap in the height direction. The top surfaces of the battery unit 20 and the power conversion unit 30 are at substantially the same height, and are lower than the top surface of the fuel tank 7, which is disposed in a rear section. Accordingly, although the battery unit 20 is disposed in the vehicle cabin 11, the battery unit 20 does not protrude into the vehicle cabin 11. The bottom surfaces of the battery unit 20 and the power conversion unit 30 are also at substantially the same height, and the height thereof is substantially the same as the height of the bottom surface of the fuel tank 7 disposed in the rear section. Accordingly, none of these components protrude downward.

Arrangement of Connectors of Power Conversion Unit

The arrangement of connectors of the power conversion unit 30 will now be described with reference to FIGS. 3 to 6.

As shown in FIGS. 3 to 6, all of the electrical connections between the power conversion unit 30 and other devices are provided by connectors. The connectors of the power conversion unit 30 include a direct-current cable connector 34, a front three-phase cable connector 35, rear three-phase cable connectors 36L and 36R, an air-conditioning cable connector 37, and a control harness connector 38.

The direct-current cable connector 34 is connected to the battery unit 20 by a direct-current cable 51, and inputs direct-current high-voltage electric power supplied from the battery unit 20 to the inverters 32 and the DC-DC converter 33. The housing 31 of the power conversion unit 30 includes a projecting portion 31a that projects rightward from a right side surface 30c thereof, and the direct-current cable connector 34 is provided on a front surface 30d of the projecting portion 31a. The direct-current cable 51, which is connected to the direct-current cable connector 34, extends parallel to the front surface of the power conversion unit 30 below the center cross member 13 after being bent the first time, and then extends through a through hole 13a in the center cross member 13 and a through hole 12b in the floor panel 12 and enters the vehicle cabin 11 after being bent the second time. Thus, the direct-current cable 51 is connected to the battery unit 20. The through hole 13a in the center cross member 13 and the through hole 12b in the floor panel 12 overlap in plan view.

The direct-current cable connector 34 according to present embodiment is integrated with a low-voltage output cable connector, which supplies low-voltage electric power converted by the DC-DC converter 33 to a low-voltage device, such as a low-voltage battery. More specifically, the direct-current cable 51 according to the present embodiment includes a high-voltage direct current line connected to the battery unit 20, and a low-voltage direct current line connected to the low-voltage device. Owing to the connection between the direct-current cable 51 and the direct-current cable connector 34, not only can the electric power from the battery unit 20 be input to the power conversion unit 30, the low-voltage electric power converted by the DC-DC converter 33 can be output to a low-voltage device, such as a low-voltage battery.

The front three-phase cable connector 35 is connected to the front-wheel drive motor 5 by a front three-phase cable 52, and supplies three-phase electric power converted by the inverters 32 to the front-wheel drive motor 5. The front three-phase cable connector 35 according to the present embodiment is provided on a left side surface 30b of the power conversion unit 30. The front three-phase cable 52, which is connected to the front three-phase cable connector 35, extends toward the front of the vehicle 1 at a side of the battery unit 20 after being bent the first time, extends parallel to the front surface of the battery unit 20 after being bent the second time, and is connected to the front-wheel drive motor 5 after being bent the third time.

The rear three-phase cable connectors 36L and 36R are respectively connected to the left and right rear-wheel drive motors 6L and 6R by a pair of rear three-phase cables 53L and 53R, and supply the three-phase electric power converted by the inverters 32 to the left and right rear-wheel drive motors 6L and 6R. The rear three-phase cable connectors 36L and 36R according to the present embodiment are arranged next to each other in the left-right direction on a rear surface 30a of the power conversion unit 30 in a central region of the rear surface 30a in the left-right direction. The rear three-phase cables 53L and 53R, which are connected to the rear three-phase cable connectors 36L and 36R, extend through a recess 7a in the fuel tank 7 to a rear section of the vehicle 1, and are respectively connected to the rear-wheel drive motors 6L and 6R.

The air-conditioning cable connector 37 is connected to the air-conditioning device 8 by an air-conditioning cable (not shown), and supplies the electric power subjected to voltage conversion performed by the DC-DC converter 33 to the air-conditioning device 8. The control harness connector 38 is connected to an ECU (not shown) by a control harness (not shown), and enables transmission of control signals between the ECU and the inverters 32. The air-conditioning cable connector 37 and the control harness connector 38 according to the present embodiment are arranged on the left side surface 30b of the power conversion unit 30 together with the front three-phase cable connector 35. Since the connectors 35, 37, and 38 are near each other, the arrangement of the cables can be facilitated.

Arrangement of Rear Three-Phase Cables

The arrangement of the pair of rear three-phase cables 53L and 53R will now be described with reference to FIG. 3.

As shown in FIG. 3, the power conversion unit 30 includes the left and right rear three-phase cable connectors 36L and 36R on the rear surface 30a that opposes the rear-wheel drive motors 6L and 6R, and the rear-wheel drive motors 6L and 6R include left and right rear three-phase cable connectors 6a and 6b on front surfaces 6c thereof that oppose the power conversion unit 30. The pair of rear three-phase cables 53L and 53R, which connect the rear three-phase cable connectors 36L and 36R of the power conversion unit 30 to the rear three-phase cable connectors 6a and 6b of the rear-wheel drive motors 6L and 6R, overlap the fuel tank 7, which is disposed between the power conversion unit 30 and the rear-wheel drive motors 6L and 6R, in bottom view.

The recess 7a, which is recessed upward, is formed in the bottom surface of the fuel tank 7 so as to extend in the front-rear direction. Intermediate portions of the pair of rear three-phase cables 53L and 53R are disposed in the recess 7a in the fuel tank 7, thereby being linearly arranged and protected by the fuel tank 7. In the present embodiment, the recess 7a is disposed in a central region of the fuel tank 7 in the vehicle width direction to reduce the impact of a side collision on the rear three-phase cables 53L and 53R.

The intermediate portions of the pair of rear three-phase cables 53L and 53R are arranged in the height direction in the recess 7a, and are retained by a bracket 7b provided in the recess 7a. The bracket 7b includes a cable retaining portion 7c that retains the pair of rear three-phase cables 53L and 53R from below (at the bottom). Even when the rear three-phase cables 53L and 53R approach the ground, the cable retaining portion 7c comes into contact with the ground first, so that the risk of damage to the rear three-phase cables 53L and 53R can be reduced.

The left and right rear three-phase cable connectors 36L and 36R provided on the power conversion unit 30 and the left and right rear three-phase cable connectors 6a and 6b provided on the rear-wheel drive motors 6L and 6R are laterally symmetrical in the vehicle width direction about the recess 7a. Accordingly, the pair of rear three-phase cables 53L and 53R may have the same structure.

Rear Three-Phase Cable Structure

The structure of the rear three-phase cables 53L and 53R will now be described with reference to FIGS. 7 and 8.

Figure 7:
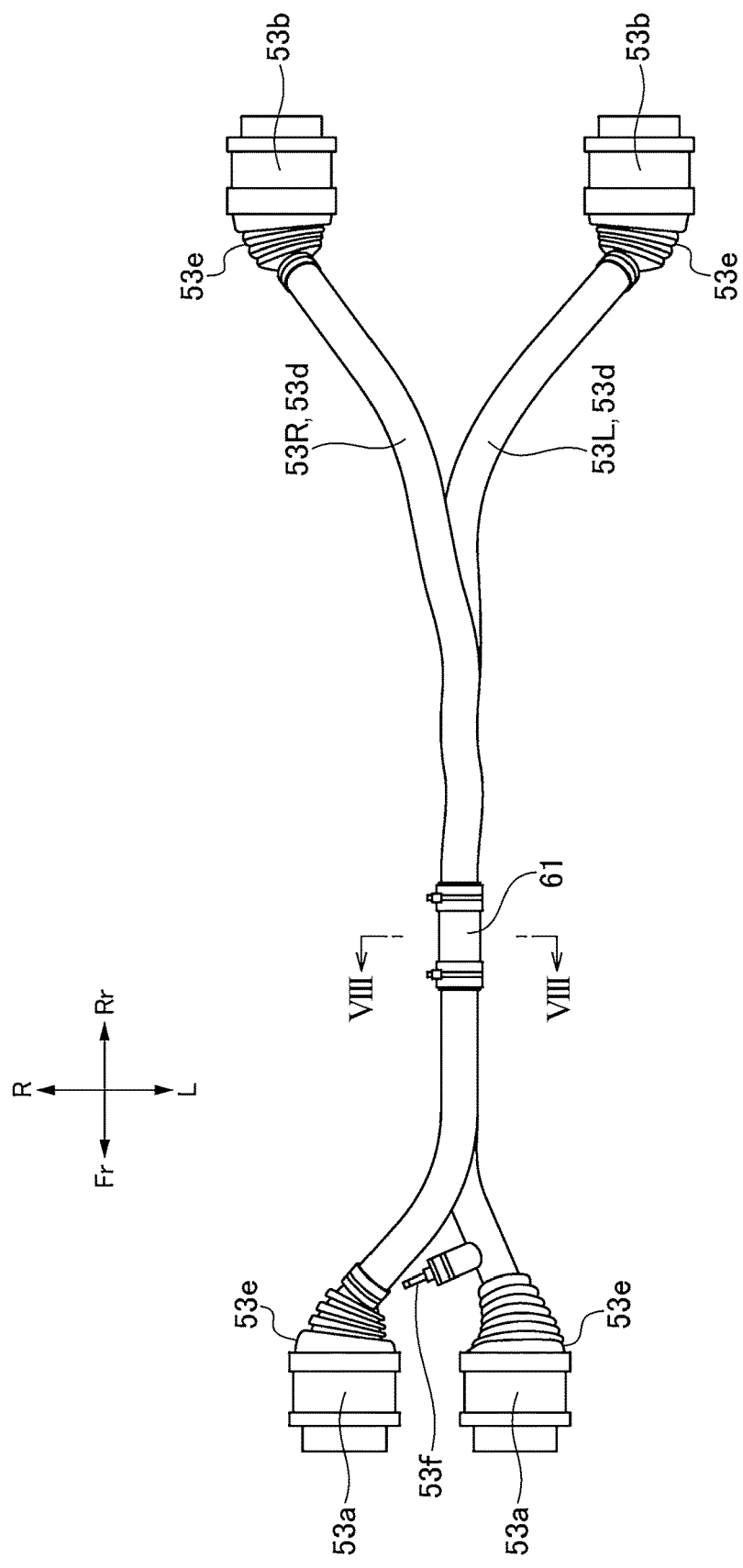
FIG. 7 is a plan view of rear three-phase cables according to the embodiment of the present disclosure.
Figure 8:
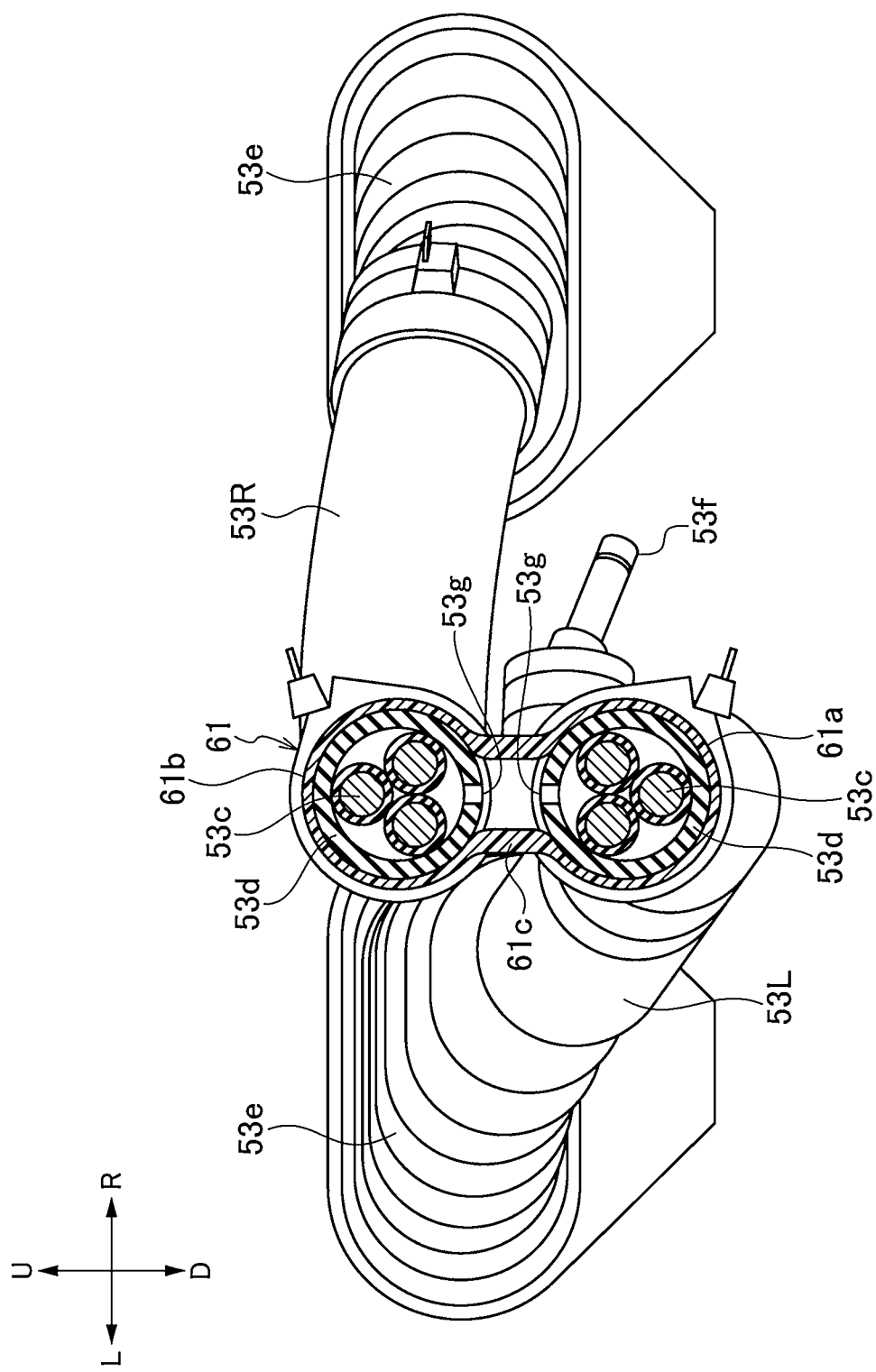
FIG. 8 is a sectional view taken along line VIII-VIII in FIG. 7.

As shown in FIGS. 7 and 8, the rear three-phase cables 53L and 53R are connector cables having a waterproof function. Each of the rear three-phase cables 53L and 53R includes a power-conversion connector 53a connected to the corresponding one of the rear three-phase cable connectors 36L and 36R of the power conversion unit 30; a motor connector 53b connected to the corresponding one of the rear three-phase cable connectors 6a and 6b of the rear-wheel drive motors 6L and 6R; a three-phase line 53c that electrically connects the power-conversion connector 53a to the motor connector 53b; a corrugated tube 53d that covers the three-phase line 53c; and sealing grommets 53e that airtightly connect the connectors 53a and 53b to the corrugated tube 53d.

The rear three-phase cables 53L and 53R having the above-described waterproof function are each required to enable ventilation of the space inside the corrugated tube 53d to reduce the risk that the corrugated tube 53d and the sealing grommets 53e will be damaged due to expansion and compression of the air in the corrugated tube 53d caused by a change in environmental temperature or self-heating. For example, a ventilation-tube connecting portion 53f is provided on the corrugated tube 53d, so that the space inside the corrugated tube 53d can be ventilated through the ventilation-tube connecting portion 53f.

In the present embodiment, the ventilation structures for enabling ventilation of the pair of rear three-phase cables 53L and 53R are integrated together to simplify the structure. More specifically, the space inside the corrugated tube 53d of the rear three-phase cable 53L and the space inside the corrugated tube 53d of the rear three-phase cable 53R are configured to communicate with each other, and the ventilation-tube connecting portion 53f is provided on the corrugated tube 53d of the rear three-phase cable 53L, so that the spaces inside the corrugated tubes 53d of the rear three-phase cables 53L and 53R can both be ventilated through the ventilation-tube connecting portion 53f.

In the present embodiment, a connecting grommet 61, which retains the corrugated tubes 53d of the pair of rear three-phase cables 53L and 53R in a connected state, is used to enable the spaces inside the corrugated tubes 53d of the pair of rear three-phase cables 53L and 53R to communicate with each other. The connecting grommet 61 includes a first retaining portion 61a that is airtightly fitted around the corrugated tube 53d of the rear three-phase cable 53L, a second retaining portion 61b that is airtightly fitted around the corrugated tube 53d of the rear three-phase cable 53R, and a communicating portion 61c that connects the first retaining portion 61a and the second retaining portion 61b to each other and enables the inside of the first retaining portion 61a and the inside of the second retaining portion 61b to communicate with each other. The corrugated tubes 53d of the pair of rear three-phase cables 53L and 53R have communication holes 53g through which the spaces inside the corrugated tubes 53d communicate with the communicating portion 61c of the connecting grommet 61. Thus, the spaces inside the corrugated tubes 53d of the pair of rear three-phase cables 53L and 53R communicate with each other through the connecting grommet 61.

Ventilation Structure of Power Conversion Unit

The ventilation structure of the power conversion unit 30 will now be described with reference to FIG. 4.

Figure 4:
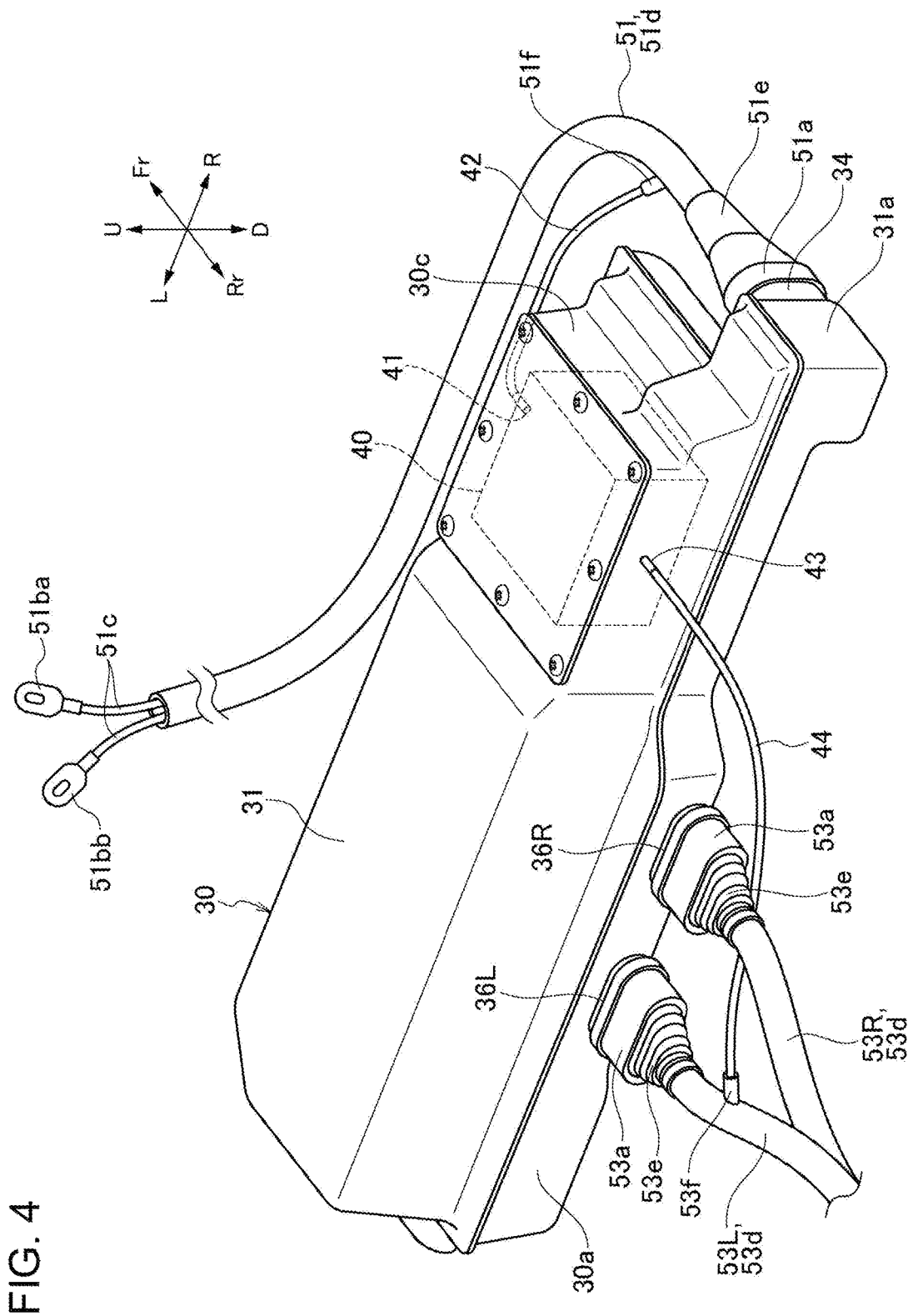
FIG. 4 is a perspective view illustrating the state in which cables are connected to a power conversion unit according to the embodiment of the present disclosure.
Figure 5:
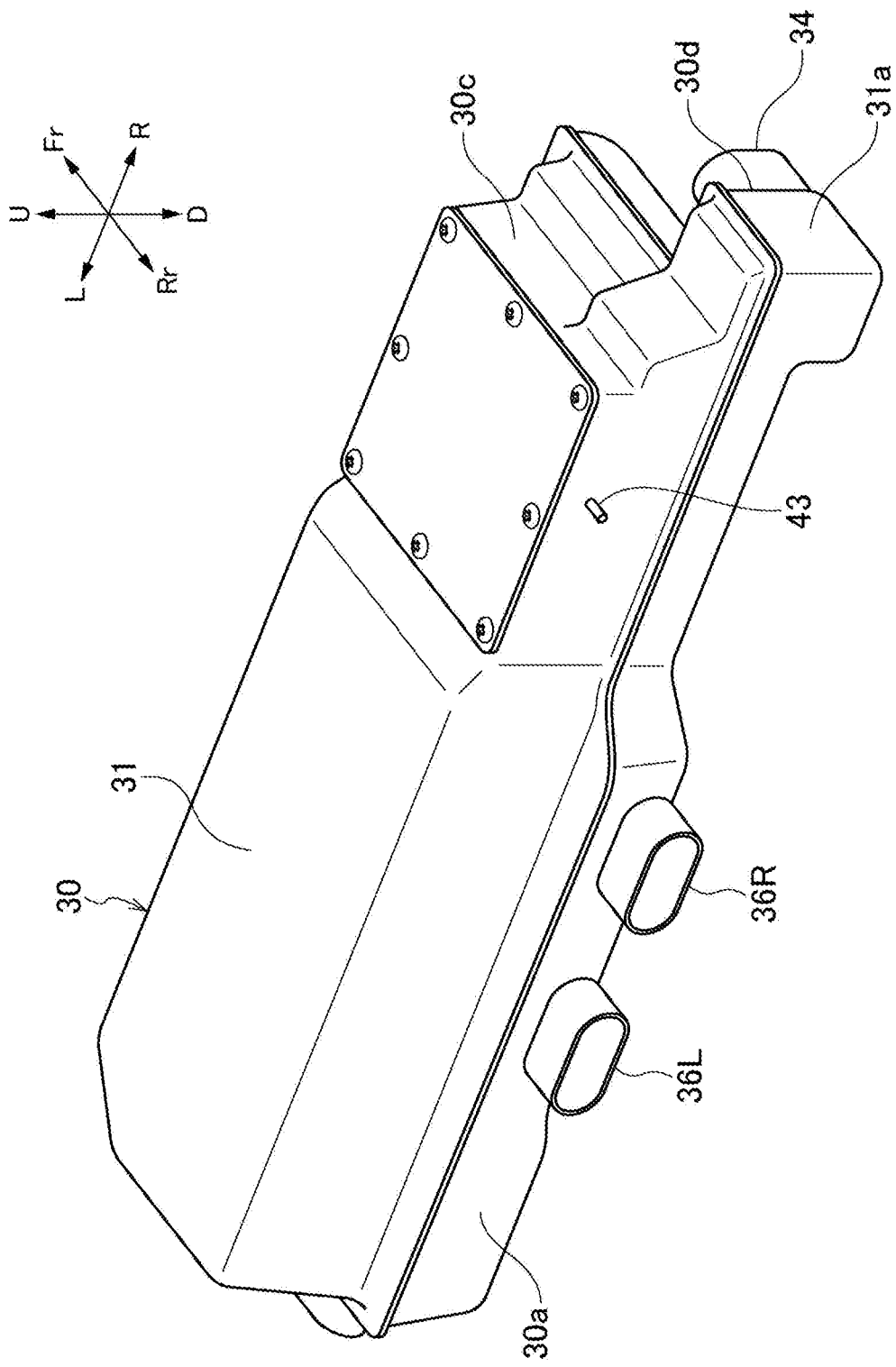
FIG. 5 is a perspective view of the power conversion unit according to the embodiment of the present disclosure.
Figure 6:
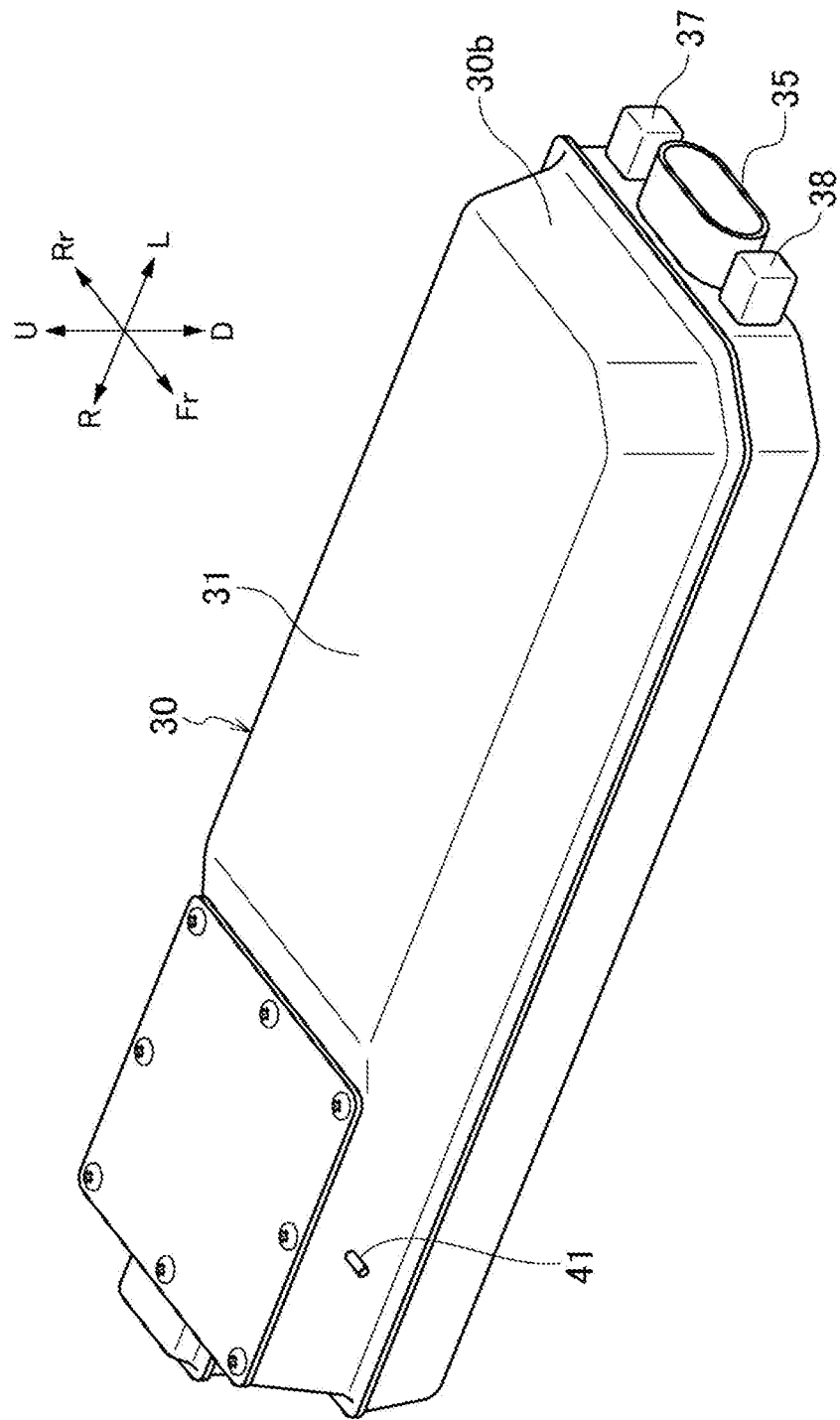
FIG. 6 is a perspective view of the power conversion unit according to the embodiment of the present disclosure viewed in another direction.

As shown in FIG. 4, the power conversion unit 30 includes a breather chamber 40 that enables ventilation of an electronic-device accommodation space provided in the power conversion unit 30. The breather chamber 40 communicates with the electronic-device accommodation space in the power conversion unit 30 through a vent plug (not shown), and also communicates with the space outside the power conversion unit 30 through a ventilation nozzle 41.

In the present embodiment, the direct-current cable 51, which extends inside and outside the vehicle cabin 11, is used to enable the breather chamber 40 to communicate with the space inside the vehicle cabin 11. The direct-current cable 51 includes a power-conversion connector 51a connected to the direct-current cable connector 34 of the power conversion unit 30; a battery terminal 51b a connected to the battery unit 20; a low-voltage-device terminal 51b b connected to the low-voltage device; direct current lines 51c that electrically connect the power-conversion connector 51a to the battery terminal 51b a and to the low-voltage-device terminal 51b b; a corrugated tube 51d that covers the direct current lines 51c; a sealing grommet 51e that airtightly connects the power-conversion connector 51a to the corrugated tube 51d; and a ventilation-tube connecting portion 51f that is disposed near the power-conversion connector 51a and that communicates with the space inside the corrugated tube 51d. The ventilation-tube connecting portion 51f is connected to the ventilation nozzle 41 of the breather chamber 40 by a ventilation tube 42. Accordingly, the breather chamber 40 communicates with the space inside the vehicle cabin 11 through the spaces inside the ventilation tube 42 and the direct-current cable 51.

In the present embodiment, the breather chamber 40 of the power conversion unit 30 is used to enable ventilation of the spaces inside the corrugated tubes 53d of the rear three-phase cables 53L and 53R. More specifically, the ventilation-tube connecting portion 53f of the rear three-phase cables 53L and 53R is connected to an auxiliary ventilation nozzle 43 provided on the breather chamber 40 by a ventilation tube 44, so that the spaces inside the corrugated tubes 53d of the rear three-phase cables 53L and 53R communicate with the space inside the vehicle cabin 11 through the spaces inside the breather chamber 40, the ventilation tube 42, and the direct-current cable 51.

As described above, according to the present embodiment, the ventilation-tube connecting portion 53f, to which the ventilation tube 44 is connected, is provided on the corrugated tube 53d of one of the rear three-phase cables 53L and 53R, and the spaces inside the corrugated tubes 53d can be ventilated through the ventilation-tube connecting portion 53f enable. Accordingly, the risk that the corrugated tubes 53d and the sealing grommets 53e will be damaged due to expansion and compression of the air inside the corrugated tubes 53d caused by a change in environmental temperature or self-heating can be reduced.

Since the space inside the corrugated tube 53d of the rear three-phase cable 53L and the space inside the corrugated tube 53d of the rear three-phase cable 53R communicate with each other, the spaces inside both corrugated tubes 53d can be ventilated simply by providing the ventilation-tube connecting portion 53f on one of the corrugated tubes 53d. As a result, the ventilation structure is simpler and the cost is lower than in the case where the ventilation structure is provided for each cable.

The space inside the corrugated tube 53d of the rear three-phase cable 53L communicates with the space inside the corrugated tube 53d of the rear three-phase cable 53R through the connecting grommet 61, which retains the corrugated tube 53d of the rear three-phase cable 53L and the corrugated tube 53*d* of the rear three-phase cable 53R. Thus, the communicating structure can be easily formed.

The ventilation tube 44 communicates with the breather chamber 40 of the housing 31 that houses the inverters 32, and the spaces in the corrugated tubes 53*d* of the rear three-phase cables 53L and 53R are opened to the atmosphere through the breather chamber 40 for the inverters 32. Accordingly, the ventilation structure for the rear three-phase cables 53L and 53R can be further simplified by integrating the ventilation structure for the rear three-phase cables 53L and 53R with the ventilation structure for the inverters 32.

The inverters 32 and the rear three-phase cables 53L and 53R are disposed outside the vehicle cabin 11, and the breather chamber 40 communicates with the inside of the vehicle cabin 11. Therefore, although the inverters 32 and the rear three-phase cables 53L and 53R are disposed outside the vehicle cabin 11, entrance of water into the inverters 32 and the rear three-phase cables 53L and 53R can be prevented.

The inverters 32 are connected to the battery unit 20 disposed in the vehicle cabin 11 by the direct-current cable 51, and the breather chamber 40 communicates with the inside of the vehicle cabin 11 through the space inside the direct-current cable 51. Thus, the direct-current cable 51 can be used to enable the spaces inside the breather chamber 40 and the rear three-phase cables 53L and 53R to communicate with the inside of the vehicle cabin 11.

The present disclosure is not limited to the above-described embodiment, and modifications, improvements, etc., may be made as appropriate.

For example, although the ventilation-tube connecting portion 53*f* is provided on the corrugated tube 53*d* of the rear three-phase cable 53L in the above-described embodiment, the ventilation-tube connecting portion 53*f* may instead be provided on the corrugated tube 53*d* of the rear three-phase cable 53R.

According to a first aspect of the present disclosure, a cable structure includes a first cable (for example, rear three-phase cable 53L according to the embodiment described below) and a second cable (for example, rear three-phase cable 53R according to the embodiment described below). The first cable includes a power line (for example, three-phase line 53*c* according to the embodiment described below), on which connectors (for example, power-conversion connector 53*a* and motor connector 53*b* according to the embodiment described below) are provided at both ends of the power line, and a tube (for example, corrugated tube 53*d* and sealing grommets 53*e* according to the embodiment described below) that covers the power line. The second cable includes a power line (for example, three-phase line 53*c* according to the embodiment described below), on which connectors (for example, power-conversion connector 53*a* and motor connector 53*b* according to the embodiment described below) are provided at both ends of the power line, and a tube (for example, corrugated tube 53*d* and sealing grommets 53*e* according to the embodiment described below) that covers the power line. The first cable and the second cable have a waterproof function. A space inside the tube of the first cable communicates with a space inside the tube of the second cable. A ventilation-tube connecting portion (for example, ventilation-tube connecting portion 53*f* according to the embodiment described below), to which a ventilation tube (for example, ventilation tube 44 according to the embodiment described below) is connected, is provided on the tube of the first cable or the tube of the second cable. The space inside the tube of the first cable and the space inside the tube of the second cable are capable of being ventilated through the ventilation-tube connecting portion.

According to the first aspect of the present disclosure, the ventilation-tube connecting portion, to which the ventilation tube is connected, is provided on the tube of the first cable or the tube of the second cable, and the spaces inside the tubes are capable of being ventilated through the ventilation-tube connecting portion. Therefore, the risk that the tubes will be damaged due to expansion and compression of the air in the tubes caused by a change in environmental temperature or self-heating can be reduced. In addition, since the space inside the tube of the first cable and the space inside the tube of the second cable communicate with each other, the spaces inside both tubes can be ventilated simply by providing the ventilation-tube connecting portion on one of the tubes. As a result, the ventilation structure is simpler and the cost is lower than in the case where the ventilation structure is provided for each cable.

In the cable structure, the tube of the first cable and the tube of the second cable may each include a corrugated tube (for example, corrugated tube 53*d* according to the embodiment described below) and sealing grommets (for example, sealing grommets 53*e* according to the embodiment described below) that connect the connectors to the corrugated tube. The corrugated tube of the first cable and the corrugated tube of the second cable may be retained by a connecting grommet (for example, connecting grommet 61 according to the embodiment described below), and the space inside the tube of the first cable may communicate with the space inside the tube of the second cable through the connecting grommet.

In this case, since the space inside the tube of the first cable communicates with the space inside the tube of the second cable through the connecting grommet, which retains the corrugated tube of the first cable and the corrugated tube of the second cable, the communicating structure can be easily formed.

In the cable structure, the ventilation tube may communicate with a breather chamber (for example, breather chamber 40 according to the embodiment described below) of a housing (for example, housing 31 according to the embodiment described below) that houses an electronic device (for example, inverters 32 according to the embodiment described below), and the space inside the tube of the first cable and the space inside the tube of the second cable may each be opened to atmosphere through the breather chamber.

In this case, since the ventilation tube communicates with the breather chamber of the housing that houses the electronic device, and since the spaces inside the tubes of the cables are each opened to atmosphere through the breather chamber of the electronic device, the ventilation structure for the cables can be further simplified by integrating the ventilation structure for the cables with the ventilation structure for the electronic device.

According to a second aspect of the present disclosure, a vehicle (for example, vehicle 1 according to the embodiment described below) includes an electronic device (for example, inverters 32 according to the embodiment described below) and a cable (for example, rear three-phase cables 53L and 53R according to the embodiment described below) connected to the electronic device. The electronic device is housed in a housing (for example, housing 31 according to the embodiment described below) including a breather chamber (for example, breather chamber 40 according to the embodiment described below) opened to atmosphere. The cable includes a power line (for example, three-phase line 53c according to the embodiment described below), on which connectors (for example, power-conversion connector 53a and motor connector 53b according to the embodiment described below) are provided at both ends of the power line, and a tube (for example, corrugated tube 53d according to the embodiment described below) that covers the power line so that the cable has a waterproof function. A ventilation-tube connecting portion, to which a ventilation tube is connected, is provided on the tube. The ventilation tube communicates with the breather chamber. A space inside the tube is opened to atmosphere through the breather chamber.

According to the second aspect of the present disclosure, since the ventilation tube communicates with the breather chamber of the housing that houses the electronic device, and since the space inside the tube of the cable is opened to atmosphere through the breather chamber of the electronic device, the ventilation structure for the cable can be simplified by integrating the ventilation structure for the cable with the ventilation structure for the electronic device.

In the vehicle, the electronic device and the cable may be disposed outside a vehicle cabin (for example, vehicle cabin 11 according to the embodiment described below), and the breather chamber may communicate with an inside of the vehicle cabin.

In this case, since the electronic device and the cable are disposed outside the vehicle cabin and the breather chamber communicates with an inside of the vehicle cabin, although the electronic device and the cable are disposed outside the vehicle cabin, entrance of water into the electronic device and the cables can be prevented.

In the vehicle, the electronic device may be connected to a motor (for example, rear-wheel drive motors 6L and 6R according to the embodiment described below) by the cable, which is a three-phase cable, and to a high-voltage device (for example, battery unit 20 according to the embodiment described below) disposed in the vehicle cabin by a direct-current cable (for example, direct-current cable 51 according to the embodiment described below). The breather chamber may communicate with an inside of the vehicle cabin through a space inside the direct-current cable.

In this case, since the electronic device is connected to the high-voltage device disposed in the vehicle cabin by the direct-current cable, and since the breather chamber communicates with the inside of the vehicle cabin through the space inside the direct-current cable, the direct-current cable can be used to enable the spaces inside the breather chamber and the three-phase cable to communicate with the inside of the vehicle cabin.

Obviously, numerous modifications and variations of the present invention are possible in light of the above teachings. It is therefore to be understood that within the scope of the appended claims, the invention may be practiced otherwise than as specifically described herein.

What is claimed is:

1. A pair of cable structures comprising:
a first cable including a power line, on which connectors are provided at both ends of the power line, and a tube that covers the power line; and
a second cable including a power line, on which connectors are provided at both ends of the power line, and a tube that covers the power line,
wherein the first cable and the second cable have a waterproof function,
wherein a space inside the tube of the first cable communicates with a space inside the tube of the second cable,
wherein a ventilation-tube connecting portion, to which a ventilation tube is connected, is provided on the tube of the first cable or the tube of the second cable, and
wherein the space inside the tube of the first cable and the space inside the tube of the second cable are capable of being ventilated through the ventilation-tube connecting portion.

2. The pair of cable structures according to claim 1, wherein the tube of the first cable and the tube of the second cable each include a corrugated tube and sealing grommets that connect the connectors to the corrugated tube,
wherein the corrugated tube of the first cable and the corrugated tube of the second cable are retained by a connecting grommet, and
wherein the space inside the tube of the first cable communicates with the space inside the tube of the second cable through the connecting grommet.

3. The pair of cable structures according to claim 1, wherein the ventilation tube communicates with a breather chamber of a housing that houses an electronic device, and
wherein the space inside the tube of the first cable and the space inside the tube of the second cable are each opened to atmosphere through the breather chamber.

4. A vehicle comprising:
an electronic device; and
a cable connected to the electronic device,
wherein the electronic device is housed in a housing including a breather chamber opened to atmosphere,
wherein the cable includes
a power line, on which connectors are provided at both ends of the power line, and
a tube that covers the power line so that the cable has a waterproof function,
wherein a ventilation-tube connecting portion, to which a ventilation tube is connected, is provided on the tube,
wherein the ventilation tube communicates with the breather chamber, and
wherein a space inside the tube is opened to atmosphere through the breather chamber.

5. The vehicle according to claim 4, wherein the electronic device and the cable are disposed outside a vehicle cabin, and the breather chamber communicates with an inside of the vehicle cabin.

6. The vehicle according to claim 5, wherein the electronic device is connected to a motor by the cable, which comprises a three-phase cable, and to a high-voltage device disposed in the vehicle cabin by a direct-current cable, and
wherein the breather chamber communicates with the inside of the vehicle cabin through a space inside the direct-current cable.

7. A pair of cable structures comprising:
a first cable having a waterproof structure and comprising:
a first power line having a first distal end and a second distal end opposite to the first distal end along a length of the first power line;
a first connector and a second connector provided at the first distal end and the second distal end, respectively; and
a first tube covering the first power line and having a first space inside the first tube;
a second cable having a waterproof structure and comprising:
a second power line having a third distal end and a fourth distal end opposite to the third distal end along a length of the second power line;

a third connector and a fourth connector provided at the third distal end and the fourth distal end, respectively; and a second tube covering the second power line and having a second space inside the second tube;

a communicating portion via which the first space communicates with the second space; and a ventilation-tube connecting portion provided at the first tube or the second tube and to be connected to a ventilation tube through which the first space and the second space are ventilated.

8. The pair of cable structures according to claim 7, wherein the first tube and the second tube each include a corrugated tube and sealing grommets that connect the first connector, the second connector, the third connector, and the fourth connector to the corrugated tube, the corrugated tube of the first cable and the corrugated tube of the second cable are retained by a connecting grommet, and the first space communicates with the second space through the connecting grommet.

9. The pair of cable structures according to claim 7, wherein the ventilation tube communicates with a breather chamber of a housing that houses an electronic device, and the first space and the second space are each opened to atmosphere through the breather chamber.

10. A vehicle comprising:

an electronic device;

a housing including a breather chamber opened to atmosphere and accommodating the electronic device; and a cable connected to the electronic device, the cable comprising:

a power line on which connectors are provided at both ends of the power line;

a tube covering the power line so that the cable has a waterproof structure; and a ventilation-tube connecting portion provided at the tube and connected to a ventilation tube which communicates with the breather chamber such that a space inside the tube is opened to atmosphere through the breather chamber.

11. The vehicle according to claim 10, wherein the electronic device and the cable are disposed outside a vehicle cabin, and the breather chamber communicates with an inside of the vehicle cabin.

12. The vehicle according to claim 11, wherein the electronic device is connected to a motor by the cable, which comprises a three-phase cable, and to a high-voltage device disposed in the vehicle cabin by a direct-current cable, and the breather chamber communicates with the inside of the vehicle cabin through a space inside the direct-current cable.

\* \* \* \* \*